(12) United States Patent
Förg et al.

(10) Patent No.: US 12,442,179 B2
(45) Date of Patent: Oct. 14, 2025

(54) SEALING DEVICE FOR DOUBLE EDGE JOINTS, AND DRYWALL

(71) Applicant: Hilti Aktiengesellschaft, Schaan (LI)

(72) Inventors: Christian Förg, Buchloe (DE); Manfred Klein, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 104 days.

(21) Appl. No.: 18/042,634

(22) PCT Filed: Aug. 20, 2021

(86) PCT No.: PCT/EP2021/073172
§ 371 (c)(1),
(2) Date: Feb. 23, 2023

(87) PCT Pub. No.: WO2022/043224
PCT Pub. Date: Mar. 3, 2022

(65) Prior Publication Data
US 2023/0332398 A1    Oct. 19, 2023

(30) Foreign Application Priority Data
Aug. 24, 2020   (EP) .................................... 20192382

(51) Int. Cl.
*E04B 1/68*   (2006.01)
*E04B 1/94*   (2006.01)
(Continued)

(52) U.S. Cl.
CPC .............. *E04B 1/68* (2013.01); *E04B 1/6812* (2013.01); *E04B 1/6815* (2013.01); *E04B 1/944* (2013.01);
(Continued)

(58) Field of Classification Search
CPC ........ E04B 1/68; E04B 1/6812; E04B 1/6815; E04B 1/944; E04B 1/946; E04B 1/948;
(Continued)

(56) References Cited

U.S. PATENT DOCUMENTS

| 4,098,047 A | 7/1978 | Weber |
| 8,640,415 B2 | 2/2014 | Pilz et al. |

(Continued)

FOREIGN PATENT DOCUMENTS

| DE | 10041362 | 3/2002 | |
| DE | 10232855 A1 * | 2/2004 | ........... E04B 1/7666 |

(Continued)

OTHER PUBLICATIONS

Förg et al., U.S. Appl. No. 18/041,664, filed Feb. 14, 2023.
(Continued)

*Primary Examiner* — Jessie T Fonseca
(74) *Attorney, Agent, or Firm* — Grüneberg and Myers PLLC

(57) ABSTRACT

A sealing device can be used for a double edge joint which is formed between a floor, a wall, or a ceiling and an adjacent first cladding and a spaced-apart second cladding of drywall having double-layer cladding. The sealing device contains a sealing profile having a holding portion and a first base body for sealing a first edge joint on the first cladding and a second base body for sealing a second edge joint on the second cladding. The first and the second base bodies are connected to one another via the holding portion and, in combination therewith, form a U-shaped receptacle for the holding rail of the drywall. Furthermore, drywall can contain a sealing device of this type.

12 Claims, 4 Drawing Sheets

(51) Int. Cl.
*E04B 2/74* (2006.01)
*F16J 15/06* (2006.01)
*F16J 15/10* (2006.01)

(52) U.S. Cl.
CPC ............ *E04B 1/946* (2013.01); *E04B 2/7411* (2013.01); *F16J 15/062* (2013.01); *F16J 15/104* (2013.01); *E04B 2001/6818* (2013.01); *E04B 1/948* (2013.01); *E04B 2/7457* (2013.01)

(58) Field of Classification Search
CPC ................ E04B 2/7411; E04B 2/7457; E04B 2001/6818
See application file for complete search history.

(56) References Cited

U.S. PATENT DOCUMENTS

| | | | |
|---|---|---|---|
| 8,793,947 B2 | 8/2014 | Pilz et al. | |
| 9,290,932 B2 | 3/2016 | Pilz et al. | |
| 9,683,364 B2 | 6/2017 | Pilz et al. | |
| 9,752,318 B2* | 9/2017 | Pilz | E04B 2/7411 |
| 10,184,246 B2 | 1/2019 | Pilz et al. | |
| 10,407,899 B2* | 9/2019 | Klein | E04B 1/948 |
| 10,669,710 B2 | 6/2020 | Förg | |
| 10,753,084 B2* | 8/2020 | Pilz | E04B 1/948 |
| 11,060,283 B2 | 7/2021 | Pilz et al. | |
| 11,193,271 B2* | 12/2021 | Simonic | E04B 2/7411 |
| 11,905,705 B2 | 2/2024 | Pilz et al. | |
| 2007/0163191 A1* | 7/2007 | Berry | E04B 2/7457 52/281 |
| 2012/0174513 A1* | 7/2012 | Aitken | E04B 2/7457 52/302.1 |
| 2012/0180414 A1* | 7/2012 | Burgess | E04B 2/90 52/300 |
| 2013/0232902 A1 | 9/2013 | Mayer et al. | |
| 2015/0135631 A1* | 5/2015 | Foerg | E04B 2/7411 428/68 |
| 2015/0275506 A1* | 10/2015 | Klein | E04B 1/68 277/628 |
| 2015/0275507 A1* | 10/2015 | Klein | E04B 1/948 277/628 |
| 2016/0130802 A1* | 5/2016 | Pilz | E04B 1/948 52/483.1 |
| 2016/0208484 A1* | 7/2016 | Pilz | E04B 2/7411 |
| 2017/0198473 A1* | 7/2017 | Pilz | E04B 2/7411 |
| 2017/0328057 A1* | 11/2017 | Pilz | E04B 2/7403 |
| 2019/0284799 A1 | 9/2019 | Förg | |
| 2019/0360195 A1* | 11/2019 | Pilz | E04B 1/947 |
| 2020/0199867 A1* | 6/2020 | Ackerman | E04B 1/947 |
| 2020/0199869 A1* | 6/2020 | Simonic | E04B 2/7411 |
| 2021/0010257 A1* | 1/2021 | Klein | E04B 1/946 |
| 2024/0263444 A1 | 8/2024 | Pilz et al. | |

FOREIGN PATENT DOCUMENTS

| | | | |
|---|---|---|---|
| DE | 20221261 U1 * | 10/2005 | ............ E04B 2/7411 |
| DE | 202011000594 U1 * | 8/2012 | ........... E04B 1/6812 |
| EP | 3348729 | 7/2018 | |
| EP | 3348729 A1 * | 7/2018 | ............. B29C 48/12 |
| EP | 3388591 A1 * | 10/2018 | ............... E04B 1/68 |
| EP | 3628789 A1 * | 4/2020 | ........... E04B 1/6812 |
| WO | WO-2018188999 A1 * | 10/2018 | ............... E04B 1/68 |
| WO | WO-2018219491 A1 * | 12/2018 | ............ E04B 2/7411 |
| WO | 2019/201648 | 10/2019 | |
| WO | WO-2020064613 A1 * | 4/2020 | ........... E04B 1/6812 |

OTHER PUBLICATIONS

Förg et al., U.S. Appl. No. 18/041,675, filed Feb. 14, 2023.
Förg et al., U.S. Appl. No. 18/042,467, filed Feb. 22, 2023.
Förg et al., U.S. Appl. No. 18/042,480, filed Feb. 22, 2023.
Förg et al., U.S. Appl. No. 18/042,498, filed Feb. 22, 2023.
Förg et al., U.S. Appl. No. 18/042,767, filed Feb. 23, 2023.
International Search Report dated Nov. 9, 2021, in PCT/EP2021/073172, with English translation, 6 pages.
Written Opinion dated Nov. 9, 2021, in PCT/EP2021/073172, with English translation, 12 pages.
Hilti, "Bottom Track Seal CFS-BTS", Product Information, CFS-BTS 5/8" and CFS- BTS 1-1/4", Sep. 2023, 1 page.
Cemco®, "Hotrod® BW Compressible Firestop", Product Description, Feb. 11, 2025, 2 pages.
Cemco®, "Smoke & Sound Stop Blue (SSSB)", Product Description, Feb. 11, 2025, 2 pages.
"XHBN—Joint Systems: XHBN7—Joint Systems Certified for Canada", System No. BW-S-0024, UL Product IQ®, Sep. 6, 2024, 4 pages.
Blaze Foam, Intumescent compressible Firestop Foam, For Head of Wall Applications—Dynamic & Static, Blazing Fast Firestop Installation, RectorSeal, 2018 2 pages.

* cited by examiner

SEALING DEVICE FOR DOUBLE EDGE JOINTS, AND DRYWALL

CROSS-REFERENCE TO RELATED APPLICATIONS

This application is the National Stage entry under § 371 of International Application No. PCT/EP2021/073172, filed on Aug. 20, 2021, and which claims the benefit of priority to European Application No. 20192382.8, filed on Aug. 24, 2020. The content of each of these applications is hereby incorporated by reference in its entirety.

BACKGROUND OF THE INVENTION

Field of the Invention

The invention relates to a sealing device for a double edge joint, which is formed between a floor, a wall, or a ceiling and an adjacent first cladding and a spaced-apart second cladding of drywall having double-layer cladding. Furthermore, the invention relates to drywall having a sealing device of this type and a first cladding, which forms a first wall surface of the drywall, and a second cladding, which forms a second wall surface of the drywall, which second wall surface is opposite to the first wall surface.

Description of Related Art

Edge joints, in particular floor joints, are designed to provide sound decoupling of the drywall from adjacent walls, ceilings, or floors, in particular floorings.

The wall surfaces of the drywalls are formed by cladding parts such as gypsum boards, which often have to be protected from moisture. The edge joints therefore also form a barrier that protects the cladding parts against rising moisture, for example in the event of a pipe burst.

Drywalls, which are provided, for example, as partition walls, each have cladding on their two opposite wall sides. Two corresponding edge joints on the opposite wall sides of the drywall form a double edge joint.

The edge joints are usually sprayed with a sealing compound in order to provide a sound and fire protection function and to seal the joint against air and odors.

Sealing compounds have the disadvantage that the application is time-consuming and not very ergonomic. Furthermore, sealing compounds can usually only be used reliably at temperatures of at least 5° C. and the substrate must be dry. The inspection is not easy either, since, for example, the installation depth cannot be checked non-destructively.

SUMMARY OF THE INVENTION

The object of the invention is to provide a sealing device for a double edge joint of drywall, which ensures easy assembly of the sealing device and effective sealing of the double edge joint.

To achieve the object, a sealing device for a double edge joint is provided, which is formed between a floor, a wall, or a ceiling and an adjacent first cladding and a spaced-apart second cladding of drywall having double-layer cladding. The sealing device has a sealing profile having a holding portion and a first base body for sealing a first edge joint on the first cladding and a second base body for sealing a second edge joint on the second cladding. The first base body has a carrier portion which forms a support for the first cladding, and the second base body has a carrier portion which forms a support for the second cladding. Furthermore, the holding portion extends between the first and the second base body and is configured to seal a gap between a holding rail of the drywall and the adjacent floor, the wall, or the ceiling. The first and the second base body are connected to one another via the holding portion and form, in combination therewith, a U-shaped receptacle for the holding rail of the drywall.

The first and the second cladding form the two opposite wall surfaces of the drywall. Furthermore, the holding portion is arranged on the floor side, wall side, or ceiling side according to the position of the edge joint.

It was recognized that a sealing device of this type can be installed with little effort and forms an effective seal for both edge joints of the double edge joint. The holding portion ensures that the sealing device is reliably fastened to the holding rail of the drywall and is aligned in a defined manner on the two claddings, while the base bodies each seal and close an edge joint with a specified width. Thus, the cladding on each side of the drywall having double-cladding is effectively protected from moisture from an adjacent floor, wall, or ceiling by the corresponding base body of the sealing profile.

DETAILED DESCRIPTION OF THE INVENTION

Figure 1:
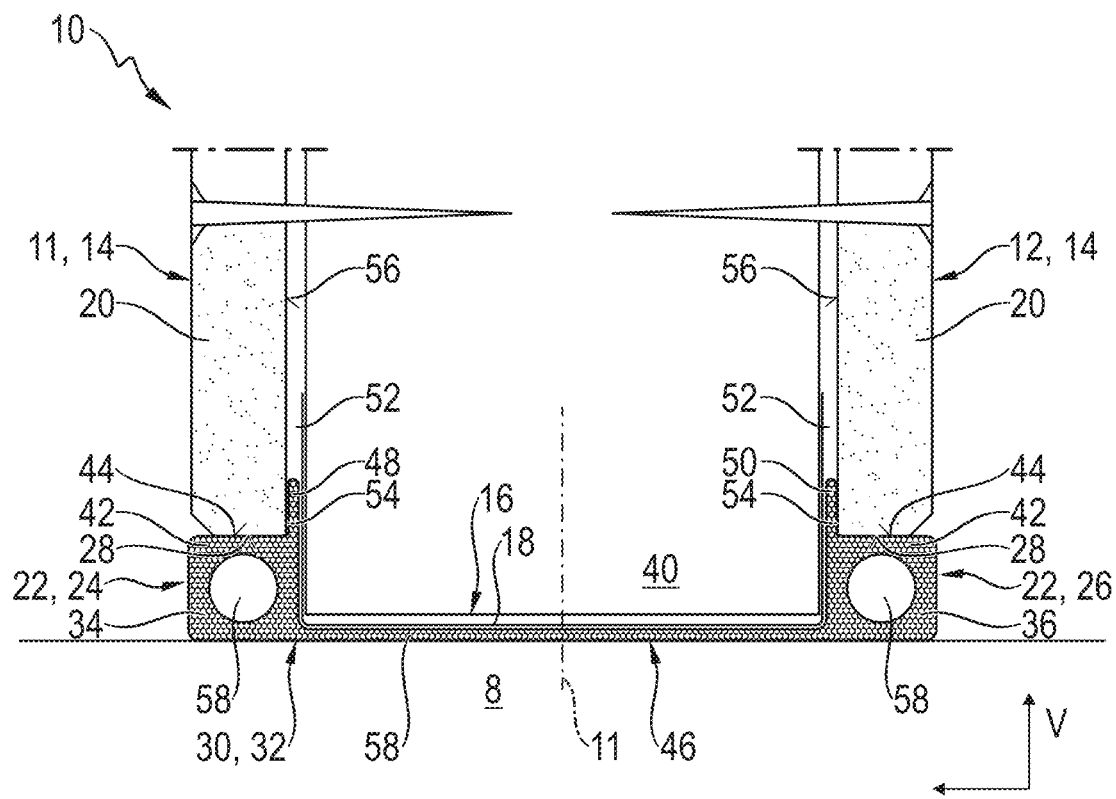
FIG. 1 is a schematic sectional view of drywall according to the invention with a sealing device according to the invention.

In one embodiment, the sealing profile has a first sealing web extending away from the first base body and a second sealing web extending away from the second base body. In this case, the first sealing web forms a lateral contact surface for the first cladding and is configured to seal a gap between the holding rail of the drywall and the first cladding, while the second sealing web forms a lateral contact surface for the second cladding and is configured to seal a gap between the holding rail of the drywall and the second cladding. The sealing webs form a further sealing plane, whereby the double edge joint is sealed particularly effectively by the sealing profile. Furthermore, the sealing webs ensure that the sealing profile is aligned in a defined manner on the two claddings.

Furthermore, the sealing profile can have through holes and/or longitudinal cuts which are at a distance from one another in the direction of extent of the profile and which form a positioning aid. The position of drywall is usually marked for assembly on the floor in order to ensure a fixed route for the drywall. The through holes form viewing windows through which a fitter can see the substrate on which the sealing profile is arranged. The same applies to embodiments with longitudinal cuts. In this case, the sealing profile is pulled apart in the regions of the longitudinal cuts in order to temporarily deform the longitudinal cuts into corresponding viewing windows. In this way, the sealing profile, in particular together with the holding rail of the drywall, can be reliably aligned along a marking with little effort.

In this case, the through holes and/or longitudinal cuts can each be provided on the holding rail side in and/or adjacent to the first or second base body. At these points, the through holes or longitudinal cuts form a particularly effective positioning aid, which makes the precise alignment of the sealing device on a marking particularly easy.

In a further embodiment, the sealing device has an intumescent strip for each base body. In particular, the intumescent strip is provided in a recess facing the holding rail in the corresponding base body. As a result, the intumescent seal is arranged in a particularly protected manner, so that damage to the intumescent seal is avoided, especially in logistics or during assembly. In this way, a particularly reliable sealing effect can be ensured in the event of fire, in particular over the entire length of the sealing device and thus over the entire length of the edge joint.

It can be provided that the first and the second base body each have a predetermined breaking point and/or are each a hollow profile having at least one cavity. In particular, the predetermined breaking point is provided adjacent to a cavity of the corresponding hollow profile. The design as a hollow profile has the advantage that the sealing profile can be produced in a very material-efficient manner. Furthermore, the base body can be more easily compressed in portions with a hollow profile, as a result of which rough cut edges of an adjacent cladding are more effectively sealed in these portions. By means of the predetermined breaking points, the geometry of the base body can be adapted in a defined manner with little effort, in particular in order to adapt the base body to the dimensions of the cladding. The amount of material that has to be separated for this purpose and accumulates as waste can be reduced by providing the predetermined breaking points in regions having cavities so that the fracture surfaces or the cutting plane run(s) through the cavities.

Furthermore, the sealing profile can have a rib structure, in particular on surfaces which are provided to be adjacent to the floor, the cladding, and/or the holding rail. The ribs of the rib structure can act as sealing ribs that improve the sealing effect of the sealing device. Furthermore, the sealing profile can hereby be formed from a resiliently compressible material with comparatively high strength.

The rib structure preferably extends in the profile direction of the sealing profile, as a result of which the rib structure can be produced with little effort, in particular by extrusion.

According to one embodiment, the sealing device is designed to be mirror-symmetrical with respect to a central plane which extends in the direction of extent of the sealing profile and perpendicular to the holding portion. The symmetrical structure of the sealing device ensures that both edge joints are equally effectively sealed by the sealing device.

According to a further embodiment, the sealing profile is an extrusion profile, as a result of which the sealing device can be produced with little effort and in any length.

The sealing profile can be formed in one piece and from a foam or an elastomer. As a result, the sealing profile can be produced inexpensively and also has a particularly high sealing effect.

According to the invention, drywall comprising a sealing device according to the invention with the aforementioned advantages is also provided to achieve the above-mentioned object. The drywall further comprises a holding rail, a first cladding forms a first wall surface of the drywall, and a second cladding forms a second wall surface of the drywall, which second wall surface is opposite to the first wall surface. The holding rail is arranged in the receptacle of the sealing device, while the holding portion is arranged between the holding rail and the adjacent floor, the wall, or the ceiling. The first cladding rests with its circumferential side against the support of the first base body and the second cladding rests with its circumferential side against the support of the second base body. In this way, the double edge joint, which is formed between the floor, wall, or ceiling and the first cladding and the second cladding can be sealed reliably and with little effort by the sealing device. In particular, the sealing device for both edge joints, the double edge joint, can be installed in one step.

It can be provided in this case that the sealing profile has a first sealing web extending away from the first base body and a second sealing web extending away from the second base body. The first sealing web forms a lateral contact surface for the first cladding and seals a gap between the holding rail of the drywall and the first cladding, while the second sealing web forms a lateral contact surface for the second cladding and seals a gap between the holding rail of the drywall and the second cladding. In this way, the sealing effect of the sealing device is particularly good.

Figure 2:
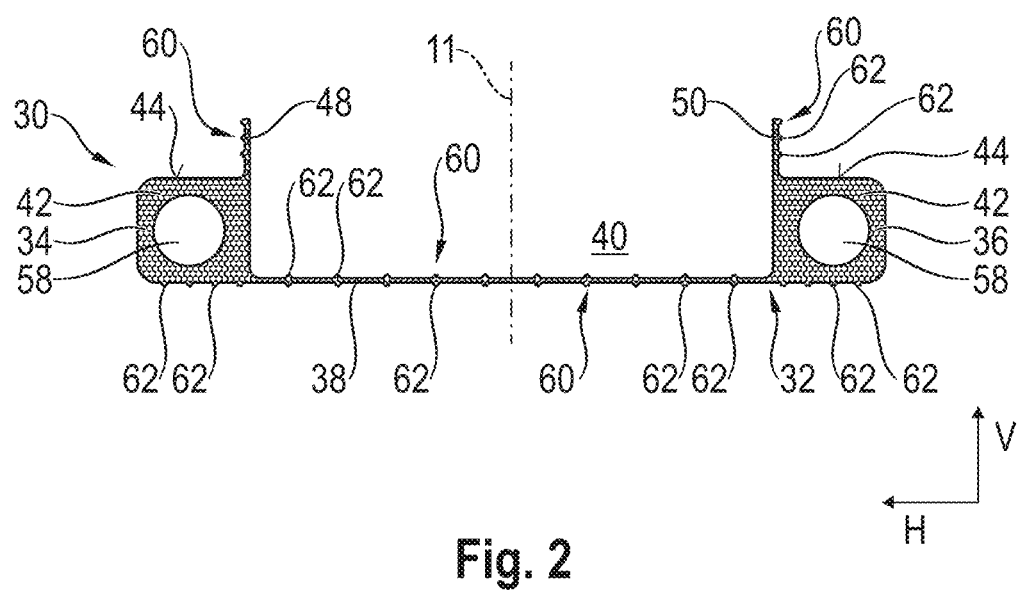
FIG. 2 is a schematic sectional view of a sealing device according to the invention in accordance with a further embodiment.
Figure 3:
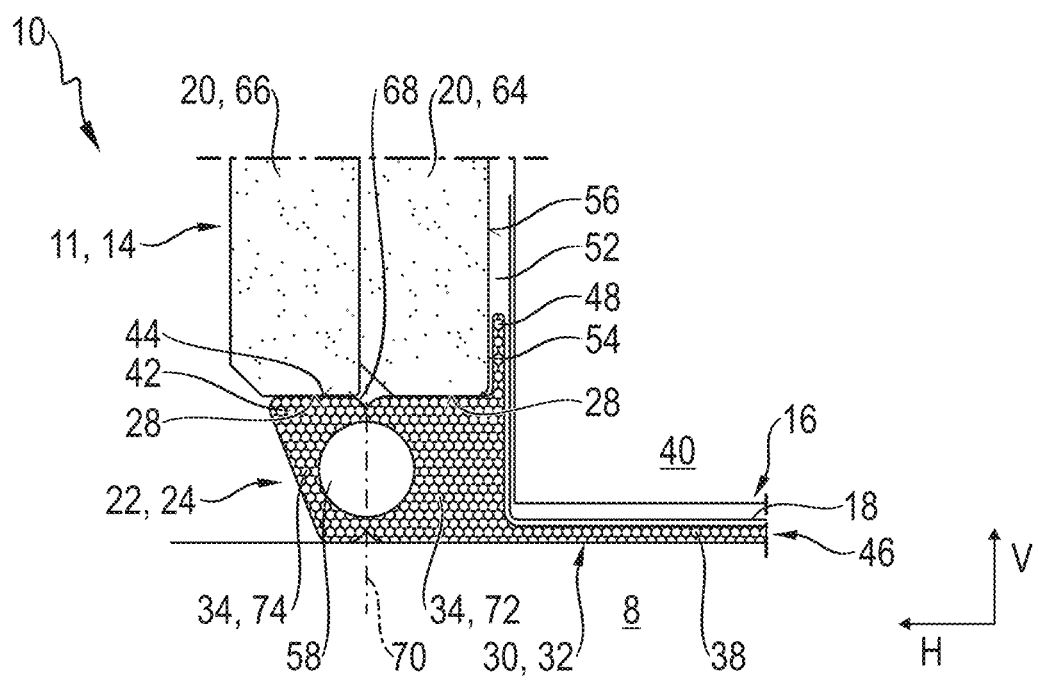
FIG. 3 is a schematic sectional view of drywall according to the invention with a wall surface having double-layer cladding and a sealing device according to the invention with a separable portion in accordance with a further embodiment.
Figure 4:
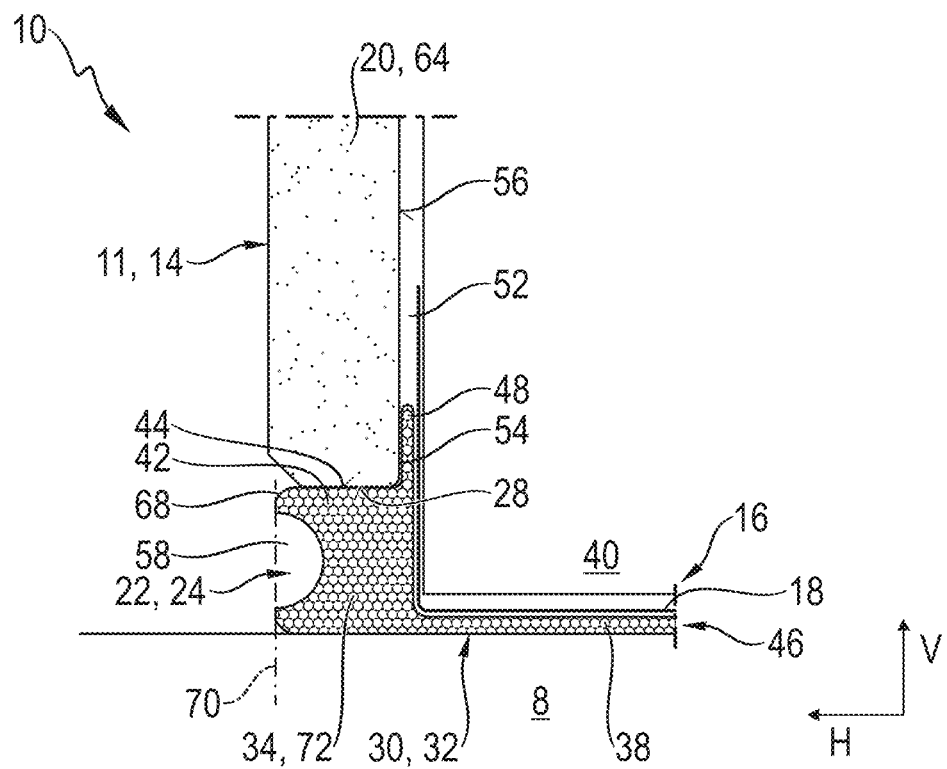
FIG. 4 is a schematic sectional view of drywall according to the invention with a wall surface having single-layer cladding according to a further embodiment and the sealing device from FIG. 3 having the detachable portion removed.
Figure 5:
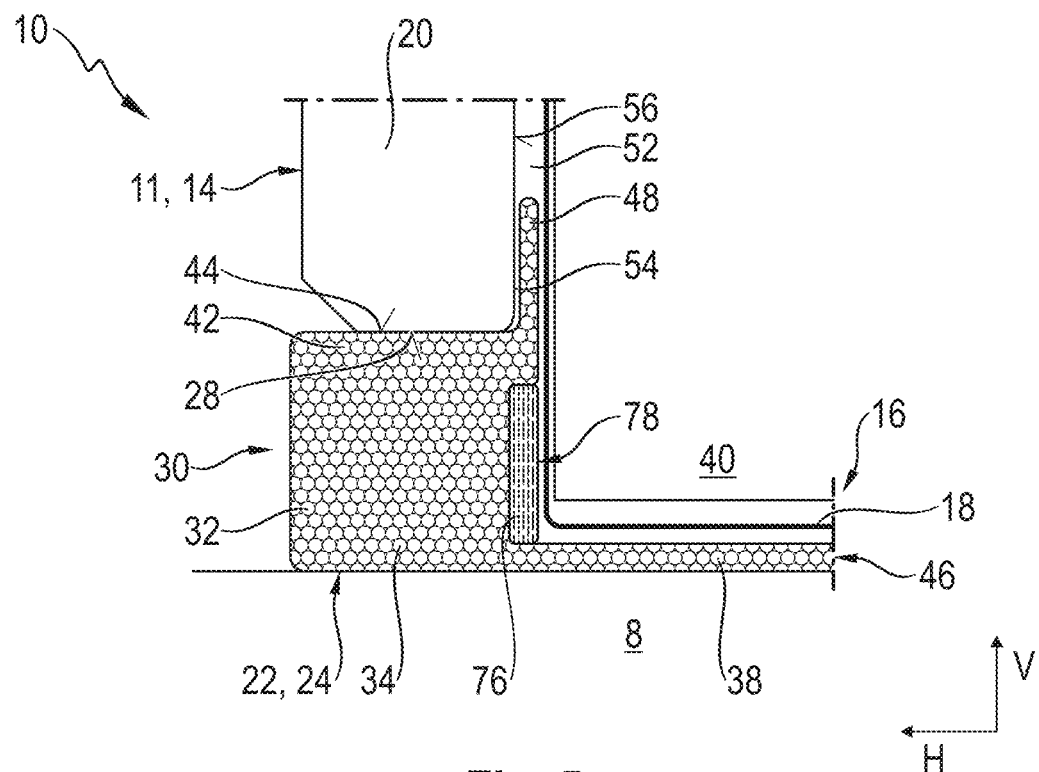
FIG. 5 is a schematic sectional view of drywall according to the invention with a sealing device according to the invention in accordance with a further embodiment.
Figure 6:
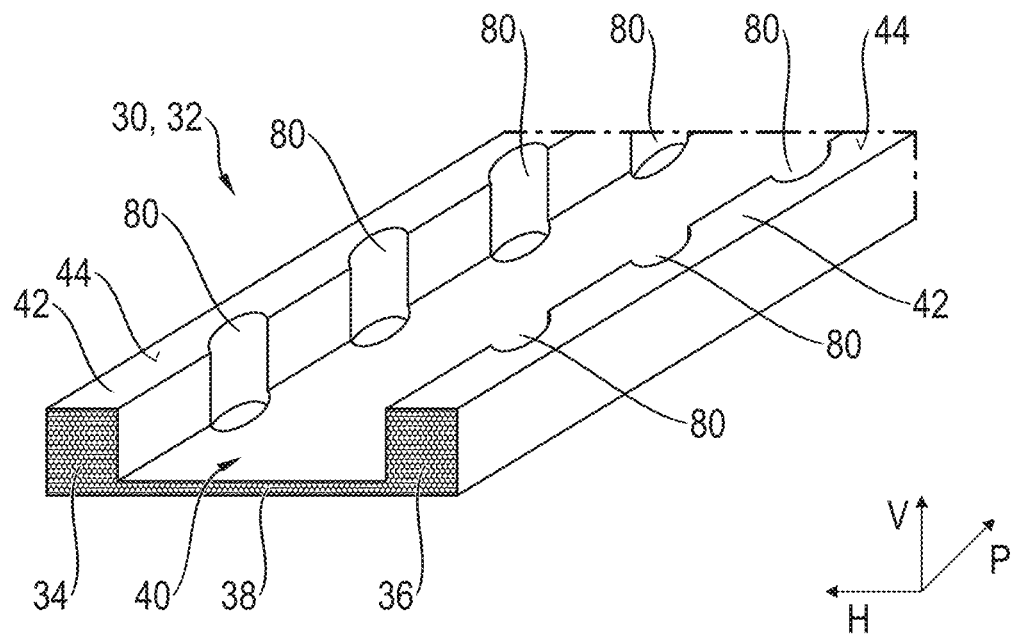
FIG. 6 is a perspective view of a sealing device according to the invention in accordance with a further embodiment.
Figure 7:
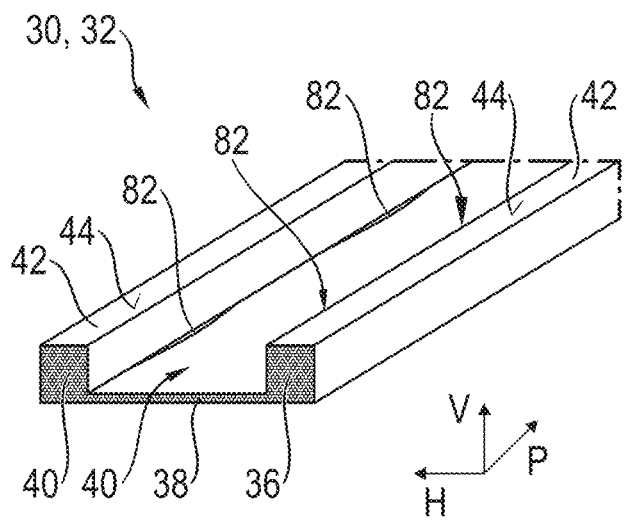
FIG. 7 is a perspective view of a sealing device according to the invention in accordance with a further embodiment in an initial state.
Figure 8:
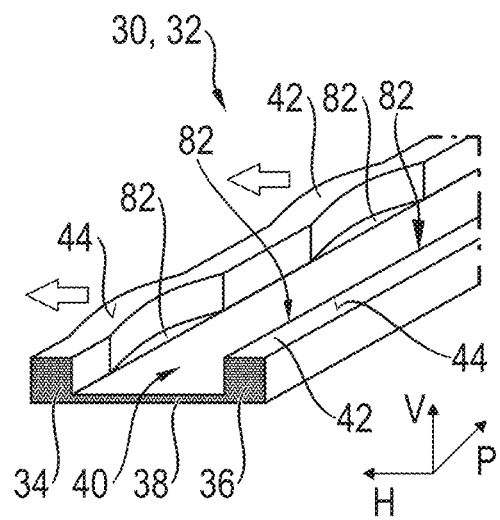
FIG. 8 is a perspective view of the sealing device from FIG. 7 in a resiliently deformed state.
Figure 9:
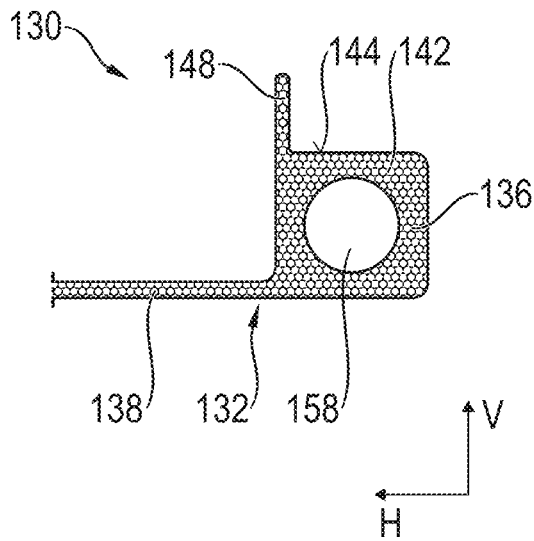
FIG. 9 is a schematic sectional view of a sealing device in accordance with an embodiment.
Figure 10:
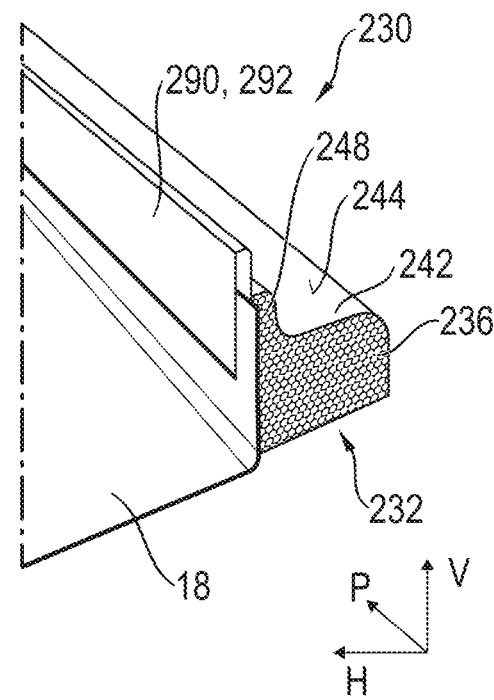
FIG. 10 is a perspective view of a sealing device according to a further embodiment.

Further advantages and features emerge from the following description and from the accompanying drawings. In the drawings:

FIG. 1 is a schematic sectional view of drywall according to the invention with a sealing device according to the invention, FIG. 2 is a schematic sectional view of a sealing device according to the invention in accordance with a further embodiment, FIG. 3 is a schematic sectional view of drywall according to the invention with a wall surface having double-layer cladding and a sealing device according to the invention with a separable portion in accordance with a further embodiment, FIG. 4 is a schematic sectional view of drywall according to the invention with a wall surface having single-layer cladding according to a further embodiment and the sealing device from FIG. 3 having the detachable portion removed, FIG. 5 is a schematic sectional view of drywall according to the invention with a sealing device according to the invention in accordance with a further embodiment, FIG. 6 is a perspective view of a sealing device according to the invention in accordance with a further embodiment, FIG. 7 is a perspective view of a sealing device according to the invention in accordance with a further embodiment in an initial state, FIG. 8 is a perspective view of the sealing device from FIG. 7 in a resiliently deformed state, FIG. 9 is a schematic sectional view of a sealing device in accordance with an embodiment, and FIG. 10 is a perspective view of a sealing device according to a further embodiment.

FIG. 1 is a cross section of drywall 10 having double-layer cladding with a first cladding 11 and a second cladding 12, each of which forms one of the two oppositely arranged wall surfaces 14 of the drywall 10. The drywall 10 further comprises a stand construction 16 with a holding rail 18.

In the present case, the holding rail 18 is a floor profile that is firmly anchored on the floor 8, for example by means of dowels.

The wall surfaces 14 each have single-layer cladding, i.e. the first and the second cladding 11, 12 each have one cladding part 20 (gypsum wall) in the horizontal direction H.

In principle, in an alternative embodiment, the first and/or the second cladding 11, 12 of the drywall 10 can have a plurality of cladding parts 20 in the horizontal direction H, i.e. each of the wall surfaces 14 can have multiple layers of cladding, in particular with two adjacent cladding parts 20 in the horizontal direction H (see FIG. 3).

The first and second cladding 11, 12 are each attached to the stand construction 16 at a distance from the floor 8 in the vertical direction V, whereby a double edge joint 22 having a first edge joint 24 and a second edge joint 26 is formed. The first edge joint 24 is formed in the form of a floor joint between a circumferential side 28 of the first cladding 11 and the floor 8, while the second edge joint 26 is formed in the form of a floor joint between a circumferential side 28 of the second cladding 12 and the floor 8.

In order to seal the double edge joint 22, the drywall 10 also has a sealing device 30, the structure of which is described below with reference to FIG. 1. The sealing device 30 is also suitable for sealing a corresponding double edge joint 22 between the drywall 10 and the ceiling and/or wall.

The sealing device 30 has a one-piece sealing profile 32 having a first base body 34, a second base body 36 and a bottom-side holding portion 38 which connects the first base body 34 and the second base body 36 in the horizontal direction H. The first base body 34 and the second base body 36 together with the holding portion 38 form a U-shaped receptacle 40 in which the holding rail 18 is received.

The receptacle 40 has a width in the horizontal direction H which corresponds to the width of the holding rail 18 in the horizontal direction H. As a result, the sealing profile 32, in particular with the first and second base bodies 34, 36, rests sealingly against the holding rail 18.

The sealing profile 32 is designed mirror-symmetrically with respect to a central plane M, which extends in the vertical direction V and in the direction of extent of the sealing profile 32, the direction of extent of the sealing profile 32 in FIG. 1 being perpendicular to the plane of the drawing.

The first and second base bodies 34, 36 each have a planar carrier portion 42 which forms a support 44 against which the corresponding cladding 11, 12 rests with its circumferential side 28.

The base bodies 34, 36 form the sealing portions of the sealing device 30, which seal the double edge joint 22. The first base body 34 seals the first edge joint 24, while the second base body 36 seals the second edge joint 26.

The holding portion 38 is arranged between the holding rail 18 and the base 8, wherein it rests sealingly against both the holding rail 18 and the floor 8.

Since the holding portion 38 connects the first base body 34 to the second base body 36, the holding portion 38 extends in the horizontal direction H over the entire width of the holding rail 18 and forms a sealing portion which seals the intermediate space 46 between the holding rail 18 and the floor 8 and in particular completely fills it out.

Furthermore, the holding portion 38 holds the base bodies 34, 36 in a defined position, as a result of which the double edge joint 22 is reliably sealed.

Adjacent to the receptacle 40, the sealing profile 32 has a first sealing web 48, which extends perpendicularly away from the carrier portion 42 of the first base body 34, and a second sealing web 50, which extends perpendicularly away from the carrier portion 42 of the second base body 36.

The sealing webs 48, 50 each extend in the vertical direction V into a gap 52 that is formed between the holding rail 18 and the edge 54 of the inner end face 56 of the corresponding cladding 11, 12 adjacent to the circumferential side 28.

The holding portion 38 and the edges 54 rest laterally on opposite sides against the sealing webs 48, 50 in a flat and sealing manner. In this way, the sealing webs 48, 50 each form a sealing portion which seals the corresponding gap 52.

The sealing device 30 is an extruded profile.

The sealing profile 32 consists of a plastics material, for example EPDM, PE foam, PP foam, PS foam, or particle foam.

In principle, the sealing device 30 can be made of any material and in any way. Preferably, however, at least the sealing profile 32 is an extruded profile.

Furthermore, the sealing profile 32 can be sheathed at least in portions with a film.

The base bodies 34, 38 are each designed as a hollow profile with a cavity 58, as a result of which the sealing profile 32 can be produced in a material-efficient manner and the base bodies 34, 36 are particularly flexible in the portions adjacent to the cavities 58. Alternatively, base bodies without a cavity are also conceivable.

In order to reliably seal the double edge joint 22 with the sealing device 30, the holding rail 18 is aligned together with the sealing device 30 on the floor 8 during the assembly of the drywall 10 and then anchored in the floor 8.

The sealing device 30 is provided separately from the holding rail 18 and is connected thereto by the holding rail 18 being plugged or inserted into the receptacle 40.

When the holding rail 18 is anchored, the holding portion 38 is clamped between the holding rail 18 and the floor 8, as a result of which the intermediate space 46 is effectively sealed.

The first cladding 11 is now set up with its circumferential side 28 on the carrier portion 42 so that the edge 54 of the end face 56 rests against the first sealing web 48 and the first base body 34 is pressed against the floor 8 and then fastened to the stand construction 16.

The second cladding 12 is fastened by means of the second base body 36 in an analogous manner opposite to the first cladding 11 on the stand construction 16.

Since each cladding 11, 12 is placed on the sealing device 30 during assembly, it is ensured that the two edge joints 24, 26 each have a defined width in the vertical direction V, while the weight of the cladding 11, 12 ensures that the base bodies 34, 36 rest sealingly against the floor 8.

In principle, the sealing device 30 can be used to seal any double edge joint 22 that is formed between the circumferential sides 28 of two spaced-apart claddings 11, 12 and an adjacent floor, an adjacent wall or ceiling.

A sealing device according to a further embodiment will now be described with reference to FIG. 2. The same reference signs are used for the components which are known from the above embodiment and in this respect reference is made to the preceding explanations.

In contrast to the sealing device 30 shown in FIG. 1, the sealing profile 32 has a rib structure 60 with sealing ribs 62 which rib structure extends in the direction of extent of the sealing profile 32, the direction of extent of the sealing profile 32 in FIG. 2 being perpendicular to the plane of the drawing.

The rib structure 60 is provided on the side of the sealing profile 32 facing the floor, wall, or ceiling, and is formed both on the holding portion 38 and on the base bodies 34, 36.

Furthermore, the rib structure 60 is formed on the holding portion 38 on the side adjacent to the receptacle 40 and on the sealing webs 48, 50 on the side facing the cladding 11, 12.

Of course, in an alternative embodiment, the sealing device 30 can have a rib structure 60 on one or more arbitrary surfaces of the sealing profile 32, in particular on surfaces that are adjacent to other structures or components in the assembled state of the drywall 10.

A sealing device according to a further embodiment will now be described with reference to FIGS. 3 and 4. The same reference signs are used for the components which are known from the above embodiments and in this respect reference is made to the preceding explanations.

FIGS. 3 and 4 only show the region of the drywall 10, which region shows the first edge joint 24. Of course, the region of the drywall 10 that comprises the second edge joint 26 can be designed accordingly.

The sealing device 30 shown in FIG. 3 is provided for drywall 10 having double-layer cladding. This means that the cladding 11 has an inner first cladding part 64 adjacent to the stand construction 16 and, adjacent to the first cladding part 64, a second cladding part 66 that forms the outer side of the drywall 10.

For this purpose, the support 44 has a width in the horizontal direction H which is greater than the wall thickness of a cladding part 64, 66

Of course, in an alternative embodiment, the support 44 can have a width in the horizontal direction H which corresponds to any multiple of the wall thickness of a cladding part 64, 66. For a sealing device 30, which is provided for double-layer cladding, the support 44 can in particular have a width in the horizontal direction H which corresponds to between 150% and 200% of the wall thickness of a cladding part 64, 66.

The first base body 34 also has a predetermined breaking point 68 which defines a vertical cutting plane 70 which divides the first base body 34 in the horizontal direction H into a base portion 72, which is assigned to the first cladding part 64, and a separating portion 74, which is assigned to the second cladding part 66.

In this case, the width of the support 44 of the base portion 72 in the horizontal direction H corresponds to the wall thickness of a cladding part 64, 66.

By separating the separating portion 74 at the predetermined breaking point 68, the first base body 34 can be shortened in a defined manner so that it is adapted to cladding 11 with a cladding part 64, 66 (see FIG. 4).

The cutting plane 70 runs through the cavity 58 of the first base body 34, as a result of which the separation can be carried out with little effort and results in a reduced loss of material.

A sealing device according to a further embodiment will now be described with reference to FIG. 5. The same reference signs are used for the components which are known from the above embodiments and in this respect reference is made to the preceding explanations.

FIG. 5 only shows the region of the drywall 10, which region shows the first edge joint 24. The region of the drywall 10 that comprises the second edge joint 26 can be designed accordingly.

In contrast to the embodiment shown in FIG. 1, the sealing device 30 has two intumescent strips 76 provided as a fire protection function, which are each arranged in a recess 78 adjacent to the receptacle 40 in the first base body 34 or second base body 36 (not shown in FIG. 5).

In principle, the sealing device 30 can have any number of intumescent strips 76, which are provided at any points on the sealing device 30.

Additionally or alternatively, the sealing profile 32 can be formed from a material that comprises fire protection additives.

In all embodiments, a fire protection design without intumescent strips 76 or without intumescent material can be provided, in particular if the sealing profile 32 is formed from a temperature-resistant material.

In the embodiment shown in FIG. 5, the first base body 34 is also designed as a solid profile, i.e. without a cavity 58, but this can also be different.

A sealing device according to a further embodiment will now be described with reference to FIG. 6. The same reference signs are used for the components which are known from the above embodiments and in this respect reference is made to the preceding explanations.

The sealing device 30 shown in FIG. 6 has a positioning aid which is formed by a plurality of through holes 80 which are at a distance from one another in the direction of extent P of the sealing profile 32 and which extend in the vertical direction V through the sealing profile 32.

In this way, the through holes 80 form viewing windows through which the substrate on which the sealing device 30 is placed can be seen.

The through holes 80 are arranged in this case on the sides of the base bodies 34, 36 facing the receptacle 40, and each extend through both the holding portion 38 and one of the base bodies 34, 36.

In principle, the through holes 80 can be provided at any point in one of the base bodies 34, 36 and/or adjacent to one of the base bodies 34, 36 in the holding portion 38.

A sealing device according to a further embodiment will now be described with reference to FIGS. 7 and 8. The same reference signs are used for the components which are known from the above embodiments and in this respect reference is made to the preceding explanations.

In contrast to the embodiment shown in FIG. 6, the sealing device 30 has a positioning aid which is formed by longitudinal cuts 82 which are at a distance from one another in the direction of extent P of the sealing profile 32 instead of by through holes 80. The longitudinal cuts 82, which are arranged adjacent to the second base body 36, are covered in FIGS. 7 and 8 by the second base body 36 and therefore cannot be seen.

The longitudinal cuts 82 can be deformed to form viewing windows by pulling the first base body 34 in the horizontal direction H or the second base body 36 counter to the horizontal direction H. In FIG. 8, the tensile forces acting on the first base body 34 are shown by arrows.

As soon as the first base body 34 is no longer pulled, the first base body 34 returns from its resiliently deformed state (see FIG. 8), in which the viewing windows are open, back to its initial state (see FIG. 7), in which the viewing windows are closed.

In this way, a sealing device 30 is provided for a double edge joint 22 of drywall 10, which in all embodiments ensures easy assembly of the sealing device 30 combined with the erection of the stand construction 16.

Furthermore, the sealing profile 32 ensures that the double edge joint 22 is effectively sealed with respect to air and sound.

The sealing device 30 turns the drywall 10 into a fire-safe construction, by means of which smoke, temperature, and fire can be prevented from spreading over to the side of the drywall 10 that faces away from the fire.

The base bodies 34, 36 of the sealing profile 32 ensure a defined joint width and also protect the claddings 11, 12 against moisture in or on the floor 8, in particular during the construction phase.

Furthermore, the sealing device 30 is a factory-made application solution with constant properties, which makes the sealing of edge joints with a consistently high quality easier.

In particular, by means of the one-piece sealing device 30, both edge joints 24, 26 of the double edge joint 22 can be reliably sealed with little effort.

Alternatively, the sealing device can be formed from two separate sealing portions which are each provided to seal one of the two edge joints 24, 26 of the double edge joint 22.

FIGS. 9 and 10 show an embodiment of a sealing device of this type for an edge joint 24, 26. The corresponding reference signs are used for the components which are known from the above embodiments and in this respect reference is made to the preceding explanations.

FIG. 9 shows a sealing device 130 with an extruded sealing profile 132. In the assembled state, the holding portion 138 is clamped between the holding rail 18 of the stand construction 16 and the adjacent floor, the wall, or the ceiling and thus ensures that the sealing profile 132 is fixed to the stand construction 16 in a defined manner for sealing an edge joint.

FIG. 10 shows a further embodiment of a sealing device 230 with an extruded sealing profile 232.

In contrast to the embodiment shown in FIG. 9, instead of the holding portion, the sealing device 230 has a fastening device 290 in the form of a hook portion 292, by means of which the sealing device 230 can be attached to the holding rail 18.

The fastening device 290 is, for example, an extruded profile made of plastics material.

The invention is not limited to the embodiments shown. In particular, individual features of one embodiment can be combined in any way with features of other embodiments, in particular independently of the other features of the corresponding embodiments.

For example, the positioning aids shown in FIG. 6 to 8 can be provided in all embodiments. Positioning aids are not necessary for the embodiment shown in FIG. 10, for example, since the assembly process takes place only after the assembly of the holding rail.

Furthermore, each sealing device can be configured for single-layer and/or double-layer cladding.

The invention claimed is:

1. A sealing device for a double edge joint formed between a floor, a wall, or a ceiling and an adjacent first cladding and a spaced-apart second cladding of drywall having double-layer cladding, the sealing device comprising:
   a sealing profile having
   a holding portion,
   a first base body for sealing a first edge joint on the first cladding, and
   a second base body for sealing a second edge joint on the second cladding,
   wherein the first base body has a first carrier portion which forms a first support for the first cladding, and the second base body has a second carrier portion which forms a second support for the second cladding,
   wherein the holding portion extends between the first base body and the second base body and is configured to seal a gap between a holding rail of the drywall and the adjacent floor, the wall, or the ceiling,
   wherein the first base body and the second base body are connected to one another via the holding portion and, in combination therewith, form a U-shaped receptacle for the holding rail of the drywall,
   wherein the first base body has a first intumescent strip configured to be provided in a first recess facing the holding rail,
   wherein the second base body has a second intumescent strip configured to be provided in a second recess facing the holding rail,
   wherein the sealing profile has a first sealing web extending away from the first base body and a second sealing web extending away from the second base body,
   wherein the first sealing web forms a first lateral contact surface for the first cladding and is configured to seal a gap between the holding rail of the drywall and the first cladding, and
   wherein the second sealing web forms a second lateral contact surface for the second cladding and is configured to seal a gap between the holding rail of the drywall and the second cladding.

2. The sealing device according to claim 1, wherein the sealing profile has through holes and/or longitudinal cuts, which are at a distance from one another in a direction of extent of the sealing profile.

3. The sealing device according to claim 2, wherein the through holes and/or the longitudinal cuts are provided on a holding rail side in and/or adjacent to the first base body or the second base body.

4. The sealing device according to claim 1, wherein the first base body and the second base body each have a predetermined breaking point and/or are each a hollow profile having at least one cavity.

5. The sealing device according to claim 1, wherein the sealing profile has a rib structure.

6. The sealing device according to claim 1, wherein the sealing device is designed mirror-symmetrically with respect to a central plane which extends in a direction of extent of the sealing profile and perpendicular to the holding portion.

7. The sealing device according to claim 1, wherein the sealing profile is an extrusion profile.

8. The sealing device according to claim 1, wherein the sealing profile is in one piece and is formed from a foam or an elastomer.

9. Drywall, comprising:

a sealing device, wherein the sealing device is suitable for a double edge joint formed between a floor, a wall, or a ceiling and an adjacent first cladding and a spaced-apart second cladding of drywall having double-layer cladding, the sealing device comprising:

a sealing profile having a holding portion, a first base body for sealing a first edge joint on the first cladding, and a second base body for sealing a second edge joint on the second cladding, wherein the first base body has a first carrier portion which forms a first support for the first cladding, and the second base body has a second carrier portion which forms a second support for the second cladding, wherein the holding portion extends between the first base body and the second base body and is configured to seal a gap between a holding rail of the drywall and the adjacent floor, the wall, or the ceiling, wherein the first base body and the second base body are connected to one another via the holding portion and, in combination therewith, form a U-shaped receptacle for the holding rail of the drywall, wherein the first base body has a first intumescent strip configured to be provided in a first recess facing the holding rail, and wherein the second base body has a second intumescent strip configured to be provided in a second recess facing the holding rail, a holding rail, a first cladding, which forms a first wall surface of the drywall, and a second cladding, which forms a second wall surface of the drywall, which second wall surface is opposite to the first wall surface, wherein the holding rail is arranged in the receptacle of the sealing device, wherein the holding portion is arranged between the holding rail and an adjacent floor, a wall, or a ceiling, and wherein the first cladding rests with a peripheral side against the first support of the first base body and the second cladding rests with a peripheral side against the second support of the second base body.

10. The drywall according to claim 9, wherein the sealing profile has a first sealing web extending away from the first base body and a second sealing web extending away from the second base body, wherein the first sealing web forms a first lateral contact surface for the first cladding and seals a gap between the holding rail of the drywall and the first cladding, and wherein the second sealing web forms a second lateral contact surface for the second cladding and seals a gap between the holding rail of the drywall and the second cladding.

11. The sealing device according to claim 4, wherein the first base body and the second base body are each the hollow profile having the at least one cavity, and wherein the predetermined breaking point of each of the first base body and the second base body is adjacent to the at least one cavity.

12. The sealing device according to claim 5, wherein the sealing profile has the rib structure on a surface adjacent to the floor, the first cladding, the second cladding, and/or the holding rail.

\* \* \* \* \*